United States Patent [19]

Thery

[11] 4,235,203

[45] Nov. 25, 1980

[54] TWO-ZONE COMBUSTION CHAMBER

[76] Inventor: Georges Thery, 6 place du Général Leclerc, Pierrefitte, France, 93380

[21] Appl. No.: 6,571

[22] Filed: Jan. 26, 1979

Related U.S. Application Data

[63] Continuation of Ser. No. 688,407, May 20, 1976, abandoned.

[30] Foreign Application Priority Data

Jun. 4, 1975 [FR] France .................... 75 17449

[51] Int. Cl.³ .................. F02B 5/00; F02B 23/08; F02F 3/24
[52] U.S. Cl. .................. 123/275; 123/286; 123/193 P; 123/193 CP
[58] Field of Search ............ 123/32 SP, 32 ST, 32 B, 123/32 C, 32 D, 32 G, 32 K, 191 S, 191 SP, 193 P, 193 CP, 193 CH

[56] References Cited

U.S. PATENT DOCUMENTS

| | | | |
|---|---|---|---|
| Re. 18,575 | 8/1932 | Oberhaensli | 123/191 S |
| 1,649,700 | 11/1927 | Jobes | 123/191 SP |
| 2,206,322 | 7/1940 | Huesky | 123/32 B |
| 2,735,413 | 2/1956 | Meyer et al. | 123/32 SP |
| 3,592,172 | 7/1971 | Treiber | 123/32 C |
| 3,921,607 | 11/1975 | Kawamoto | 123/191 S |
| 3,976,038 | 8/1976 | Stahl | 123/32 SP |
| 3,987,769 | 10/1976 | Yew | 123/32 SP |
| 4,026,250 | 5/1977 | Funiciello | 123/32 B |
| 4,041,909 | 8/1977 | Nakamura | 123/32 SP |

FOREIGN PATENT DOCUMENTS

1382110 11/1964 France .
3404 of 1913 United Kingdom .

*Primary Examiner*—P. S. Lall
*Attorney, Agent, or Firm*—Lerner, David, Littenberg & Samuel

[57] ABSTRACT

The present invention relates to an internal combustion engine comprising means at cylinder head and piston level for improving combustion while reducing the tendency to knocking and pollution. This engine comprises a double feed system, an intake port for a rich mixture being arranged in a hollow in the cylinder head and comprising a retaining cup at its base, an intake port for a poor mixture and a projecting part at the top of the piston covering the hollow and the retaining cup and defining a precombustion chamber for communicating with a part of the chamber opposite the hollow, via channels made at the base of the projecting part. The invention finds advantageous application in the domain of automobile vehicle construction.

9 Claims, 4 Drawing Figures

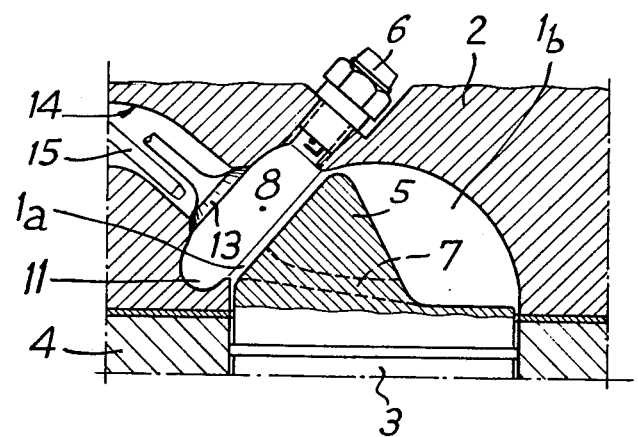
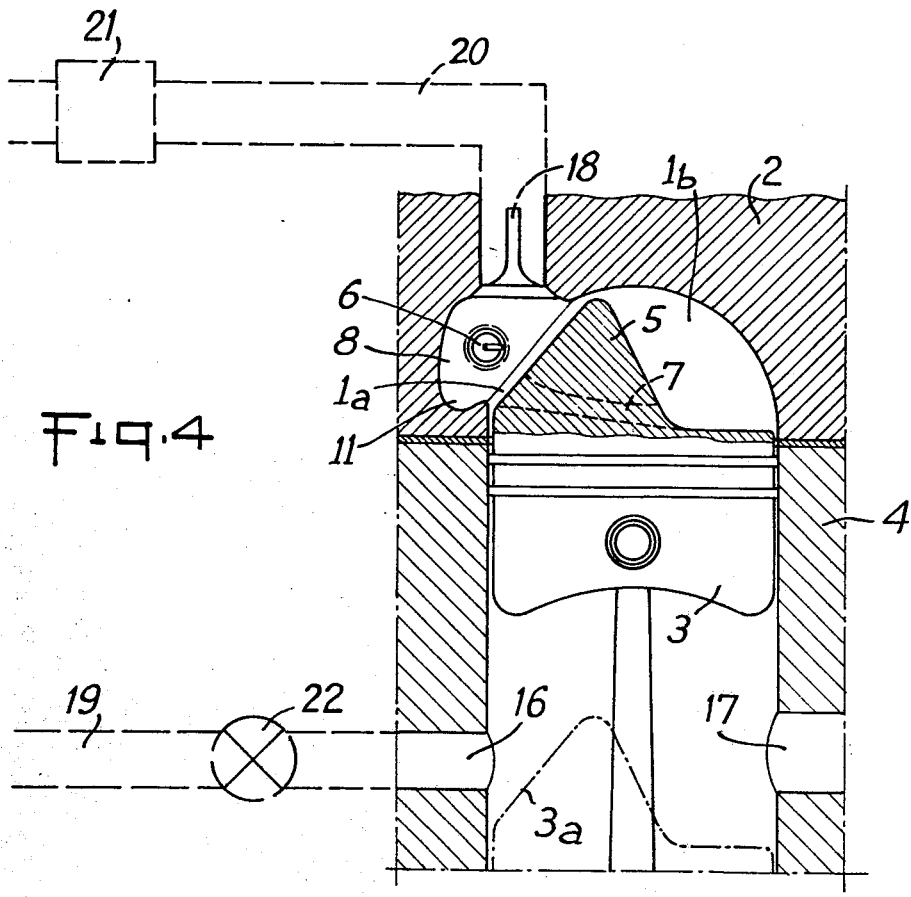

TWO-ZONE COMBUSTION CHAMBER

This is a continuation of application Ser. No. 688,407, filed May 20, 1976 now abandoned.

The present invention relates to an internal combustion engine comprising means at piston and cylinder head level for improving combustion, whilst reducing the tendency to knocking and pollution.

It is already known, in order to improve the combustion in an internal combustion engine, to shape the piston opposite the ignition member as a projection provided with a hollow so that said latter forms at top dead centre, a movable precombustion chamber. Furthermore, a system of feeding a combustion chamber may also be used which consists in allowing a rich mixture or pure fuel to be admitted at one spot and a poor mixture or combustion-supporting air to be admitted at another spot. A heterogeneous mixture is thus created.

However, these known devices which employ a heterogeneous mixture have drawbacks. The devices with precombustion chamber in the cylinder head and with fixed orifice for communication with the rest of the combustion chamber have the disadvantage of being accompanied by a loss of power, further to heat losses through the cylinder head and, due to the extension of the combustion which brings about a reduction in the work of expansion of the gases.

Furthermore, the intake devices for the two mixtures of different richness directly in the cylinder, present the drawback either of ensuring only a weak final heterogeneity of this mixture because of the interpenetration of the intake flows, or of increasing the duration of the final combustion period.

Finally, the device effecting a direct injection into the cylinder with piston having a projecting part requires the use of an expensive installation and can therefore only be of limited use.

In addition, this device causes a dilution of the fuel which is greater as the heterogeneity of the mixture is strong.

With these known devices, the result is that all that is obtained is a weak heterogeneity, thus less effective, or a strong heterogeneity accompanied by a phenomenon of harmful dilution.

It is an object of the invention to remedy these drawbacks by proposing an engine which comprises, at combustion chamber level, means for improving the combustion on the majority of types of two- or four-stroke petrol engines.

To this end, the invention relates to an alternating internal combustion engine with controlled ignition, comprising at least one piston, one cylinder and one cylinder head defining a combustion chamber, the head of said piston being provided with a projecting part dividing said combustion chamber into two zones, at top dead-centre, one of said zones, a so-called precombustion zone, being provided with a sparking plug, said combustion chamber being fed with two energetic fluids, one strongly carburetted, called rich mixture, the other weakly carburetted, called poor mixture, the rich mixture at least being admitted into the precombustion zone.

According to the invention, said precombustion zone is constituted, for at least a part of its volume, by a lateral hollow in the cylinder head, into which the rich mixture intake opens, whose base is provided with a retaining cup and which communicates by a wide opening with the combustion chamber, said opening being covered by the projecting part at top dead centre.

In addition, said projecting part defines with the cylinder head at top dead centre at least one peripheral channel, between the two zones, extending in a plane substantially perpendicular to the axis of the cylinder and of which the transverse section is such that it enables the ignition of the gases to be maintained whilst they are propagating from one zone to the other through said channel.

The invention will be more readily understood on reading the following description given by way of non-limiting example. Reference will be made to the accompanying drawings, in which;

FIGS. 2 and 3 illustrate two variant embodiments of this combustion chamber.

FIG. 4 illustrates an application of the invention to a two-stroke engine.

Figure 1:
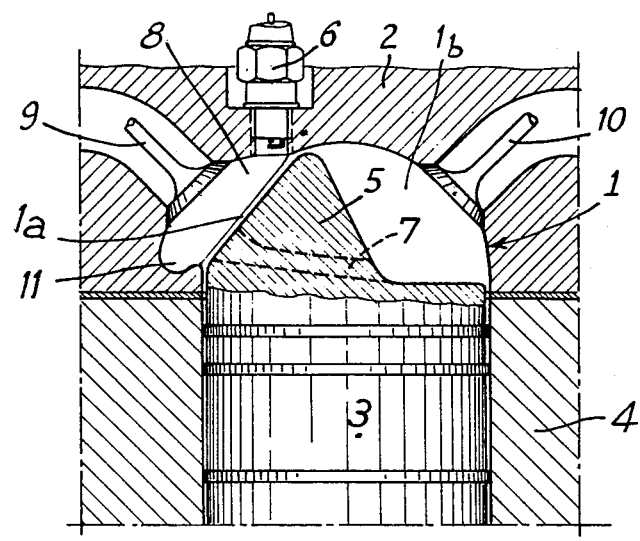
FIG. 1 is a schematic cross sectional view of a combustion chamber according to the invention.

Referring now to the drawings, FIG. 1 shows a combustion chamber 1 defined at top dead centre by a cylinder head 2, a piston 3, mounted to slide in a cylinder 4. The top of this piston comprises a projecting part 5 which, at top dead centre, divides said combustion chamber into two zones 1a and 1b, of which 1a is equipped with a sparking plug 6. Said projecting part comprises channels 7 made on its sides so as to ensure communication between said zone 1a and zone 1b at the base of the combustion chamber 1. These channels 7 extend in a plane substantially perpendicular to the axis of the cylinder and pass around the projecting part 5. In view of the section, only one of these channels 7 is shown in the Figure. A lateral hollow 8, widely open on the combustion chamber, is made in the cylinder head 2 at the level of a first intake valve 9. The ignition member 6 is preferably disposed near the hollow 8. A second intake valve 10 is capable of opening on the side of part 1b of the combustion chamber 1.

At top dead centre, the projecting part 5 of the piston 3 therefore covers the opening of the hollow 8 in the combustion chamber 1.

It is obvious that the chamber 1 also comprises at least one exhaust valve (not shown) that may extend in a plane substantially perpendicular to the plane of section.

Finally, it will be noted that the base of the hollow 8 is shaped as a retaining cup 11 that may retain liquid fuel, thus constituting a very rich mixture zone.

Figure 2:
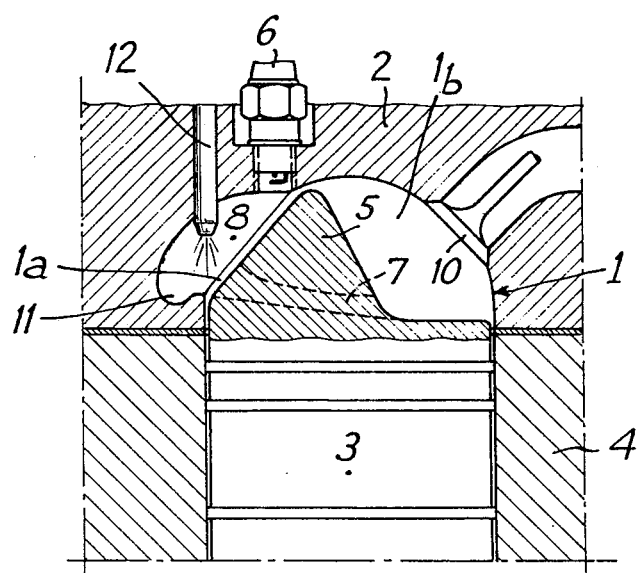

FIG. 2 shows a variant embodiment in which certain of the elements of FIG. 1 are found with the same references. An injector 12 directed towards said retaining cup 11 opens into hollow 8.

FIG. 3 schematically shows a combustion chamber in which the double feed is effected through one orifice only, with controlled opening and closure. In fact, a valve 13 obturates a first intake conduit 14 for a first mixture and a second conduit 15, inside intake conduit 14 for a second mixture.

Finally, FIG. 4 shows a combustion chamber 1 of a two-stroke engine defined by a piston similar to the one described with reference to the preceding Figures and bearing the same references. In its position 3a—bottom dead centre—the piston 3 uncovers intake ports 16 and exhaust ports 17. A secondary intake opens into the hollow 8 of cylinder head 2, its opening and closure being controlled by means of a valve 18.

As in the case of the preceding Figures, said hollow is capable of being covered by the projecting part 5 of the piston 3, when the latter is at top dead centre.

FIG. 4 also shows the pipes for admitting the mixture into the combustion chamber. An intake pipe 19 is connected to the intake port 16 whilst the pipe 20 is connected to the intake controlled by the valve 18. Finally, it will be noted that only pipe 20 comprises a carburetting device shown schematically at 21 and which may either be a carburettor or an indirect injector, whilst the pipe 18 comprises a member 22 for controlling its closure used in particular upon starting of the engine.

These pipes 19 and 20 are independent of each other, pipe 19 being, for example, connected to the housing, which in this case is a pump housing, whilst pipe 20 is connected to atmosphere with or without the use of a compressor.

In a variant (not shown), the two pipes are constituted by two branches issuing from a common pipe, the carburettor then being disposed on the branch opening out into the chamber at the level of the valve.

It is obvious that the channels 7 which pass around the base of the projecting part may be replaced, in a variant (not shown), by grooves made in the cylinder head 2 between the hollow 8 and the part 1b of the combustion chamber.

In the four Figures, the part 1a of the combustion chamber, associated with the hollow 8 constitutes a movable precombustion zone since it exists only at top dead centre.

A heterogeneous mixture of energetic fluid is admitted, in known manner, in the combustion chamber. This mixture is composed of a rich or strongly carburetted mixture and of a poor or weakly carburetted mixture. It should be noted that this poor mixture may be simply air or supporter of combustion, in which case the rich mixture would contain all the fuel.

The rich mixture is always admitted in the precombustion zone and more specifically in the hollow 8 of the cylinder head 2.

Referring to FIG. 1, the rich mixture is admitted through valve 9, whilts the poor mixture is admitted through valve 10. In the case of FIG. 2, the rich mixture is pure fuel injected into the combustion chamber by jet 12, whilst the poor mixture—air—is admitted through valve 10.

According to FIG. 3, the rich and poor mixtures are admitted through valve 13, the rich mixture being conducted through pipe 15, the poor mixture through pipe 14.

Finally, in FIG. 4, the rich mixture is admitted through valve 18, whilst the poor mixture, which is air, is admitted through intake port 16.

It will be noted that, even if the poor mixture is air, without fuel, at the moment of the explosion, i.e. at about the top dead centre at the end of compression, there will have been an enrichment of this air by the rich mixture, during the intake time of these mixtures. Finally, at the moment of ignition, two carburetted mixtures of different richness will be obtained, whilst advantageously avoiding the disadvantages due to the complexity and cost of apparatus for dosing and synchronising the rich and poor mixture prior to their intake into the combustion chamber.

Rich mixture is fed in a cylinder head zone which is particularly well cooled. There is therefore condensation of fuel along the walls of the hollow 8 which is collected in the retaining cup 11 provided at the base of said hollow 8, thus avoiding dilution of the fuel. At the end of compression, ignition takes place in the precombustion zone 1a, 8 by spark plug 6. This zone is then filled with a very rich mixture which, on igniting, increases the temperature of said zone. Consequently, the liquid fuel contained in the cup 11 evaporates, which results in the mixture being further enriched. At the same time, the pressure of the gases contained in said zone increases considerably. This excess pressure forces the ignited or incompletely burnt gases (due to lack of supporter of combustion in the precompression zone), into part 1b of the combustion chamber via channels 7. The transverse section of channel 7 are such that they do not hinder the propagation of the ignition.

By way of example, it must be at least 0.035 cm$^2$ per cubic centimeter of volume of the precombustion zone.

These ignited gases penetrate in the zone 1b of the combustion chamber at the bottom of said latter, and create a turbulence which is favourable to a complete combustion of these ejected gases. In addition, upon invention of the movement of the piston, it is the gas contained in the upper part of zone 1b which comes into contact with the rich mixture burning in the precombustion zone. It is therefore a fresh mixture constituted essentially of supporter of combustion which completes the combustion which started in the precombustion zone (1a,8). There is then creation of a second turbulence which presents the advantage of homogenising the mixture and of suitably scavenging the gases contained in the hollow 8 of the cylinder head.

It will be noted that this scavenging will be all the more effective as the opening of the hollow 8 on the chamber 1 is of large surface area. By way of indication, the surface of this opening will be at least equal to three quarters of the product of its largest dimensions in height and in width.

The arrangements according to the invention present the following general advantages:

Firstly, the projecting part 5 of the piston constitutes an effective screen against the propagation by radiation of the heat from the initially ignited zone, this bringing about an advantageous reduction in the tendency to knocking.

The communication of the combustion, ensured by the channels 7 between zones 1a and 1b of the combustion chamber, at top dead centre, reduces the duration of combustion, avoiding a delay in combustion, in the final part of the chamber.

The communication between the first part of the chamber and the last part avoids too great a turbulence upon the start of the downward stroke of the piston, by limiting the differences in pressure between these two portions of chamber.

This limitation of the pressure in the first part of the chamber prevents said latter from being taken to too high a temperature. The combustion begins by one of the hottest parts of the chamber and continues towards a well cooled zone, this reducing the tendency to knocking and to the formation of secondary ignition at high engine speed.

Since the combustion begins at the bottom of the chamber, the final portion of the non-ignited mixture is located near the fixed wall of the chamber (i.e., the cylinder head) and does not move away as a function of the displacement of the piston. There is no longer any "course" between the progression of the combustion and the displacement of the piston.

The drawbacks generally encountered in a conventional engine, at the beginning of combustion at the top of the chamber are considerable: after the top dead centre, the combustion progresses in the same direction as the displacement of the piston. If the speed of combustion is lower than or equal to the speed of the piston, the distance between the non-ignited points and the flame front is greater than or equal to what it was at the beginning of combustion. There is then a residual, unburnt part. Upon exhaust, it is firstly the burnt part which is rejected to the outside and, then, the residual part. This latter is rejected in the unburnt state.

These drawbacks are avoided by a combustion which begins at the bottom of the chamber. The ball effect of a combustion makes the flame front progress towards the cylinder head and this effect is accentuated by the tendency of combustion to progress upwardly. There is practically no tendency, at the end of expansion, to have an unburnt residual part. If there were one, it would be the one to be evacuated by the exhaust first, followed by the burnt part. The more rapid speed of flow of this latter would cause the post-combustion of the residual part in the exhaust pipe. The source of poor yield and of pollution constituted by the beginning of combustion at the top of the chamber is eliminated.

It is a portion of the ball of fire, formed by the beginning of combustion, which is expanded by the descent of the piston. The ball effect of the combustion is less limited by the cylinder head. The loss by the walls is less. The points distant from the flame front remain comparatively nearer. This results in a more rapid combustion. Upon descent of the piston, it is essentially the burnt gases which expand. These two increases in the expansion of the burnt gases improve the efficiency as much.

In addition, in the case of a carburetted mixture and a pure supporter of combustion being admitted, the intake of each of these mixtures may be regulated with respect to each other. Thus, with a fuel of low octane index, it is advantageous to open the inlet valve for the carburetted mixture with a delay in order to reduce the duration of contact between this mixture and the air admitted, and the quantity of fuel which passes into the main combustion chamber. An engine according to the invention may therefore be adapted to the fuel used, by regulating the opening of the intake valve for the carburetted mixture and thus make a poly-fuel engine.

Concerning more particularly the two-stroke engine, as illustrated in FIG. 4, any loss of carburetted mixture by the exhaust is avoided.

In fact, non-carburetted air, which may or may not be precompressed, is admitted through port 16 and the air carburetted by the device 21 (carburettor or injector) is admitted via valve 18. The opening of this valve will have been regulated so that it is effected after the beginning of the intake phase, to terminate at the latest at the end of the exhaust. In this way, a good filling is obtained whilst having effected, by intake of pure air alone through the port 16, a scavenging of the combustion chamber, without loss of fuel. In fact, the projecting part 5 diverts towards the cylinder head and the intake is a little delayed with respect to the opening of the port 16. In the vicinity of the bottom dead centre, there is a phase of beginning of exhaust, a phase of scavenging by air without fuel and a phase of intake of carburetted mixture and of end of exhaust, successively.

In addition, the mixture contained in zone 1b of the combustion chamber, at the end of compression, is relatively poor, which, whilst reducing the tendency to knocking, makes it possible to obtain a much higher rate of compression than on the other two-stroke engines. In this way, a simple engine may be produced of low cost price, having a high specific power, a good yield and low pollution.

Furthermore, the presence of the member 22 for closing the pipe 19 enables the air intake to be cut off, so as to enrich the mixture, since the only intake will be that of rich mixture through the valve opening 18. This disposition is particularly interesting upon starting.

Finally, the engines according to the invention may be equipped with humidifiers supplying either water or a mixture of alcohol and water mounted on the intake for poor mixture or for air without fuel, whose production and functioning are simple and inexpensive, contrary to an emulsifier or device for mixing by ultra-sounds or a device for synchronisation with the carburetter. On all these engines, the intake of water and the double turbulence ensure a very considerable reduction in pollution, reducing the formation of nitrogen oxides by lowering the maximum temperature of combustion and eliminating the formation of carbon monoxide and of unburnt matter due to the very great improvement in combustion ensured by the chemical catalysis which it effects.

In this way, an engine with controlled ignition may be obtained, not having a tendency to knocking approaching the rate of compression and the efficiency of the diesel engine whilst offering, for a lower cost, a higher specific power.

The intake of water procures a better cooling of the piston head, particularly sensitive on two-stroke engines.

The invention enables the problems of pollution to be efficiently and inexpensively solved, whilst permitting an increase in the specific power and efficiency and a reduction in consumption.

The invention finds advantageous application in the domain of automobile vehicle construction.

What is claimed is:

1. An internal combustion engine of the controlled-ignition type comprising at least one piston, a cylinder, and a cylinder head to define a combustion chamber, the head of said piston including a projection so that when said piston is at its top dead center position, said projection divides said combustion chamber into a temporary precombustion zone and a combustion zone, and when said piston is moved away from its top dead center position, said precombustion zone is opened to said combustion zone, said precombustion zone including means to receive a fluid of rich mixture and said combustion zone including means to receive a fluid or poor mixture, said precombustion zone being formed at least partially in said cylinder head by a recess formed therein, the recess of said precombustion zone including a fluid container at the base thereof for receiving said rich mixture such that the lower temperature of said cylinder head has a cooling effect on said precombustion zone before ignition to enhance condensation of said rich mixture and collection of same in said fluid container, said recess having a wide opening connected to said combustion zone for permitting, as said piston descends, an efficient sweeping of said recess and said fluid container to transfer unburnt rich mixture to said combustion zone to complete combustion, the exterior peripheral surface of the base of said projection including at least a groove formed therein which temporarily cooperates with said cylinder head to define at least one curved channel connecting said precombustion zone and said combustion zone for the passage of ignited gases when said projection is in said top dead center position such that the lower temperature of said cylinder head has a cooling effect on said channel, said channel extending in a plane substantially perpendicular to the axis of said cylinder and being formed in the base of said projection so that said channel enables ignition to be maintained while gases are passing from said precombustion zone to the base of said combustion zone through said channel.

2. An internal combustion engine as claimed in claim 1, comprising an intake port with valve-controlled opening and closure for each of the mixtures admitted into the combustion chamber, the intake port for the rich mixture being located in said precombustion zone, and the intake port for the poor mixture being located in said combustion zone.

3. An internal combustion engine as claimed in claim 1, further including an injector for admitting the rich mixture into said precombustion zone and directed towards said fluid container, and an orifice formed in said combustion zone for admitting said poor mixture with opening and closure of said orifice being controlled by a valve.

4. An internal combustion engine as claimed in claim 1, including a single orifice located in said precombustion zone for the admission of the rich mixture and of the poor mixture, having controlled opening and closure.

5. An internal combustion engine as claimed in claim 4, wherein said orifice includes a pipe for admitting said rich mixture.

6. An internal combustion engine as claimed in claim 1, comprising an intake port and an exhaust port, and a second intake opening at the top of the cylinder, with controlled opening and closure, opening into said precombustion zone, said rich mixture being admitted through said opening into said precombustion zone whilst poor mixture is admitted through said intake port, said intake port and said second intake opening being connected to two separate supply pipes.

7. An engine as claimed in claim 6, wherein the intake pipe for the poor mixture is provided with a member for closing it during the starting phase of the engine.

8. An internal combustion engine as claimed in claim 6, wherein said pipes are formed from the branches issuing from a common supply pipe.

9. An engine as claimed in claim 6, further including means for delaying the admission of rich mixture with respect to the intake of poor mixture.

* * * * *